(12) United States Patent
Hirose et al.

(10) Patent No.: US 7,798,504 B2
(45) Date of Patent: Sep. 21, 2010

(54) BUSH BEARING AND RACK-AND-PINION TYPE STEERING APPARATUS FOR AUTOMOBILE USING THE SAME

(75) Inventors: Masahiko Hirose, Osaka (JP); Masaaki Hashimoto, Kashiwara (JP); Yoshihide Ohara, Kashiba (JP); Takahiro Tanaka, Kashihara (JP); Hidetoshi Kaida, Kanagawa (JP); Masao Shimura, Osaka (JP)

(73) Assignees: JTEKT Corporation, Osaka (JP); OILES Corporation, Tokyo (JP)

( * ) Notice: Subject to any disclaimer, the term of this patent is extended or adjusted under 35 U.S.C. 154(b) by 160 days.

(21) Appl. No.: 12/087,734

(22) PCT Filed: Jan. 12, 2007

(86) PCT No.: PCT/JP2007/000010

§ 371 (c)(1),
(2), (4) Date: Aug. 21, 2008

(87) PCT Pub. No.: WO2007/080823

PCT Pub. Date: Jul. 19, 2007

(65) Prior Publication Data

US 2009/0000853 A1    Jan. 1, 2009

(30) Foreign Application Priority Data

Jan. 16, 2006   (JP)   ............... 2006-007247

(51) Int. Cl.
*B62D 3/12*   (2006.01)

(52) U.S. Cl. .................. 280/93.514; 384/220; 384/275; 384/276

(58) Field of Classification Search ............ 280/93.514; 384/215, 220, 275, 276, 428, 426
See application file for complete search history.

(56) References Cited

U.S. PATENT DOCUMENTS

2002/0085778 A1   7/2002   Mena
2004/0076353 A1   4/2004   Kubota et al.

FOREIGN PATENT DOCUMENTS

| EP | 1 394 426 A2 | 3/2004 |
|---|---|---|
| JP | 2000-177606 | 6/2000 |
| JP | 2002-114162 | 4/2002 |
| JP | 2003-322165 | 11/2003 |
| JP | 2004-132511 | 4/2004 |
| JP | 2004-183780 | 7/2004 |
| JP | 2004-314853 | 11/2004 |
| JP | 2004-347105 | 12/2004 |
| JP | 2007-9962 | 1/2007 |
| JP | 2007-009962 | 1/2007 |

OTHER PUBLICATIONS

International Search Report for PCT/JP2007/000010, mailed Feb. 13, 2007.

*Primary Examiner*—Eric Culbreth
(74) *Attorney, Agent, or Firm*—Nixon & Vanderhye P.C.

(57) ABSTRACT

A bush bearing includes a synthetic resin-made bush having a circumferential groove on its outer peripheral surface; an endless annular elastic member fitted in the circumferential groove of the bush; and a positioning structure for determining the position of the bush in a B direction with respect to an inner peripheral surface of a gear housing.

9 Claims, 6 Drawing Sheets

BUSH BEARING AND RACK-AND-PINION TYPE STEERING APPARATUS FOR AUTOMOBILE USING THE SAME

This application is the U.S. national phase of International Application No. PCT/JP2007/000010 filed 12 Jan. 2007 which designated the U.S. and claims priority to Japanese Patent Application No. 2006-007247 filed 16 Jan. 2006, the entire contents of each of which are hereby incorporated by reference.

TECHNICAL FIELD

The present invention relates to a bush bearing, and more particularly to a bush bearing suitably used to movably support a rack shaft in a rack-and-pinion type steering apparatus for an automobile.

BACKGROUND ART

Patent document 1: Patent Publication of Japanese Patent No. 3543652

In a rack-and-pinion type steering apparatus, a rack shaft having rack teeth meshing with the teeth of a pinion is movably supported through a bush bearing by a gear box serving as a housing. As bush bearings, synthetic resin-made bush bearings have been variously proposed, and such a synthetic resin-made bush bearing is generally adapted to movably support the rack shaft with an interference.

DISCLOSURE OF THE INVENTION

Problems to be Solved by the Invention

In the synthetic resin-made bush bearing, if a large interference is provided for the rack shaft to be supported, the rack shaft can be supported firmly in its radial direction with predetermined rigidity. However, since the rack shaft is tightened tightly, frictional resistance against sliding in the axial direction becomes large, so that it becomes impossible to support the rack shaft with a satisfactory moving characteristic. On the other hand, if a small interference is provided for the rack shaft to be supported, a satisfactory axially moving characteristic having low frictional resistance against sliding on the rack shaft can be expected. However, a large axial offset of the rack shaft and a gap between the bush bearing and the rack shaft, among others, are likely to occur, so that the rigid support in the radial direction disadvantageously declines.

In addition, with the synthetic resin-made bush bearing, a gap can occur between the bush bearing and the rack shaft due to the creep deformation of the synthetic resin, so that there is a possibility of lowering the rigid support in the radial direction. In addition, in a case where radial shrinkage, in particular, occurs due to the stress relaxation of the synthetic resin consequent upon a thermal history, there is a possibility that the interference with the rack shaft increases, resulting in a large sliding frictional resistance.

Meanwhile, the rack shaft is generally supported movably by the bush bearing at two portions on a side adjacent to the pinion and a side remote from the pinion. Particularly at the portion of the rack shaft on the side adjacent to the pinion, displacement in the axial direction of the pinion, rather than the displacement in a direction of approaching or moving away from the pinion, is likely to occur due to the effect of meshing between the teeth of the pinion and the rack teeth. Such displacement of the portion of the rack shaft on the side adjacent to the pinion in the axial direction of the pinion is in an opposite direction in correspondence with the rotating direction of the pinion. As a result, if the portion of the rack shaft on the side adjacent to the pinion is supported by the bush bearing with a large interference, there is a possibility that the steering feel is substantially deteriorated coupled with the bending deformation of the rack shaft.

In addition, if the synthetic resin-made bush bearing is used for slidably supporting the rack shaft in the rack-and-pinion type steering apparatus for an automobile, the interior of the gear box of the rack-and-pinion type steering apparatus is sealed, and the influx and efflux of air in the gear box becomes difficult. Hence, due to the enforced influx and efflux of air, there are possibilities that abnormal noise can occur, and that early disappearance of a lubricant such as grease applied to the gap between the bush bearing and the rack shaft can occur.

The present invention has been devised in view of the above-described aspects, and its object is to provide a bush bearing and a rack-and-pinion type steering apparatus for an automobile using the same, which make it possible to support the rack shaft with predetermined rigidity in its radial direction and in the axial direction of the pinion, make it possible to movably support the rack shaft with low frictional resistance in the axial direction of the rack shaft, and make it possible to reduce the effect of stress relaxation consequent upon creep deformation and thermal history.

Means for Solving the Problems

A bush bearing in accordance with the present invention comprises: a synthetic resin-made bush having at least one circumferential groove in an outer peripheral surface thereof; and an endless annular elastic member which is fitted in the circumferential groove of the bush, wherein the bush has a pair of inside inner peripheral surfaces which are disposed axially symmetrically; a pair of slits which are each disposed with one of the inside inner peripheral surfaces located therebetween in a circumferential direction, and allow that inside inner peripheral surface to be movable in a radially inward/outward direction; another pair of slits which are each disposed with the other one of the inside inner peripheral surfaces located therebetween in the circumferential direction, and allow that inside inner peripheral surface to be movable in the radially inward/outward direction; and at least one pair of outside inner peripheral surfaces disposed on an outer side than the pair of inside inner peripheral surfaces in a radial direction, wherein each of the outside inner peripheral surfaces is adapted to form a gap with a corresponding one of outer peripheral surfaces on a rack teeth side and an opposite side to the rack teeth side of a rack shaft which is inserted and secured in a through hole defined by the pair of inside inner peripheral surfaces and the pair of outside inner peripheral surfaces, and wherein each of the inside inner peripheral surfaces at least at its portion is adapted to slidably come into contact with a corresponding outer peripheral surface of the rack shaft, excluding outer peripheral surfaces on the rack teeth side and the opposite side to the rack teeth side of the rack shaft.

According to the bush bearing in accordance with the invention, the bush has the pair of inside inner peripheral surfaces which are disposed axially symmetrically; the pair of slits which are each disposed with one of the inside inner peripheral surfaces located therebetween in the circumferential direction, and allow that inside inner peripheral surface to be movable in the radially inward/outward direction; and the other pair of slits which are each disposed with the other one of the inside inner peripheral surfaces located therebetween in the circumferential direction, and allow that inside inner peripheral surface to be movable in the radially inward/outward direction. Each of the inside inner peripheral surfaces at least at its portion is adapted to slidably come into contact with a corresponding outer peripheral surface of the rack shaft, excluding outer peripheral surfaces on the rack teeth side and the opposite side to the rack teeth side of the rack shaft. Moreover, the endless annular elastic member is fitted in the circumferential groove of the outer peripheral surface of the bush. Therefore, the rack shaft can be supported with predetermined rigidity in the radial direction and the axial direction of the pinion, the displacement of the rack shaft in the axial direction of the pinion can be suppressed by the pair of inside inner peripheral surfaces, and the axial movement of the rack shaft can be movably supported with low frictional resistance. Moreover, each of the outside inner peripheral surfaces is adapted to form a gap with a corresponding one of the outer peripheral surfaces on the rack teeth side and the opposite side to the rack teeth side of the rack shaft, which is inserted and secured in the through hole defined by the inside inner peripheral surfaces and the outside inner peripheral surfaces. Hence, coupled with the above, it is possible to reduce the effect of stress relaxation consequent upon creep deformation and thermal history.

As the synthetic resin as the material for forming the bush, one which excels in abrasion resistance, has a low friction characteristic, and has predetermined flexibility and rigidity and small thermal expansion and contraction is preferable. Specifically, it is possible to cite, among others, a synthetic resin which includes at least one of polyacetal resin, polyamide resin, polyolefin resin, and fluoro resin.

The endless annular elastic member in its cross section has a circular shape, an elliptical shape, a rectangular shape, or a flattened oval shape; however, the present invention is not limited to the same, and it is possible to adopt another shape such as an X-cross-sectional shape, a U-cross-sectional shape, or a trapezoidal cross-sectional shape. Preferably, the endless annular elastic member is formed of natural rubber or synthetic rubber, or may be another elastic thermoplastic synthetic resin, e.g., a polyester elastomer. As such an endless annular elastic member, it is possible to suitably use an O-ring which is generally used. The endless annular elastic member which is fitted in the circumferential groove may protrude partially from the outer peripheral surface of the bush. Alternatively, the endless annular elastic member may be disposed in its entirety in the circumferential groove and may not protrude from the outer peripheral surface of the bush. In the case where the endless annular elastic member protrudes partially, the endless annular elastic member may be adapted to come into contact at its outer peripheral surface with the inner peripheral surface of the housing in which the bush bearing is fitted, or the endless annular elastic member may alternatively be adapted to form an annular gap between its outer peripheral surface and the inner peripheral surface of the housing.

The bush may have at least one circumferential groove in its outer peripheral surface. In a case where the bush has a plurality of circumferential grooves in its outer peripheral surface, endless annular elastic members may be fitted in the respective circumferential grooves.

Each of the inside inner peripheral surfaces in a preferred example has a flat surface shape, but may alternatively have a convex surface shape or a concave surface shape having a radius of curvature equal to or greater than the radius of curvature of the cylindrical outer peripheral surface of the rack shaft. Each of the inside inner peripheral surfaces suffices if it has a center angle $\theta 1$ about the center of the rack shaft to such an extent that each of the inside inner peripheral surfaces at least at its portion slidably comes into contact with a corresponding outer peripheral surface of the rack shaft, excluding outer peripheral surfaces on the rack teeth side and the opposite side to the rack teeth side of the rack shaft, and is thereby capable of supporting the rack shaft in the radial direction and in the axial direction of the pinion with predetermined rigidity. Preferably, each of the inside inner peripheral surfaces has a center angle $\theta 1$ of not less than 5° and not more than 90° about the center of the rack shaft, in which case each of the outside inner peripheral surfaces may have a center angle $\theta 2$ of (180°−$\theta 1$) about the center of the rack shaft. Each of the inside inner peripheral surfaces at its portion or in its entirety may be in slidable contact with a corresponding outer peripheral surface of the rack shaft, excluding outer peripheral surfaces on the rack teeth side and the opposite side to the rack teeth side of the rack shaft.

In a preferred example, each of the slits is open at one end face in an axial direction of the bush and extends in the axial direction from the one end face to a vicinity of another end face in the axial direction of the bush past the circumferential groove. Each of such slits may extend in parallel with the axial direction or may alternatively extend in such a manner as to be inclined with respect to the axial direction. Furthermore, one slit may extend in parallel with the axial direction, and another slit may extend in such a manner as to be inclined with respect to the axial direction.

The bush may further have at least one other pair of slits which are each open at the other end face in the axial direction of the bush, extend in the axial direction from the other end face to a vicinity of the one end face in the axial direction of the bush past the circumferential groove, and are respectively disposed on the rack teeth side and the opposite side to the rack teeth side of the rack shaft. In addition, the bush may have a main body portion including the inside inner peripheral surfaces, the outside inner peripheral surfaces, the outer peripheral surface, and the circumferential groove, and a plurality of protrusions provided integrally on the outer peripheral surface of the main body portion and spaced apart from each other in the circumferential direction, and the plurality of protrusions may be adapted to come into contact with an inner peripheral surface of a housing through which the rack shaft is passed. In this case, in a preferred example, one of the plurality of protrusions is disposed by being sandwiched in the circumferential direction by the pair of slits disposed with one of the inside inner peripheral surfaces located therebetween, and another one of the plurality of protrusions is disposed by being sandwiched in the circumferential direction by the other pair of slits disposed with the other one of the inside inner peripheral surfaces located therebetween. The main body portion may be formed with the same wall thickness at the portions of the inside inner peripheral surfaces and the outside inner peripheral surfaces, but may be formed with small or large wall thickness on the inside inner peripheral surfaces and with large or small wall thickness on the outside inner peripheral surfaces.

The bush bearing in accordance with the invention may further comprise positioning means for determining a position of the bush in the circumferential direction with respect to the inner peripheral surface of the housing in order to ensure that the bush is disposed with respect to the rack shaft, such that one of the outside inner peripheral surfaces forms a gap with the outer peripheral surface on the rack teeth side of the rack shaft which is inserted and secured in the through hole defined by the inside inner peripheral surfaces and the outside inner peripheral surfaces, while the other one of the outside inner peripheral surfaces forms a gap with the outer peripheral surface on the opposite side to the rack teeth side of the rack shaft, and such that each of the inside inner peripheral surfaces at least at its portion slidably comes into contact with a corresponding outer peripheral surface of the rack shaft, excluding outer peripheral surfaces on the rack teeth side and the opposite side to the rack teeth side of the rack shaft.

The positioning means in a preferred example has a projection provided integrally on the bush so as to be fitted in a recess provided in the inner peripheral surface of the housing.

A rack-and-pinion type steering apparatus for an automobile in accordance with the invention comprises: a pinion; a rack shaft having rack teeth meshing with teeth of the pinion; a housing through which the rack shaft is passed; and the bush bearing of the above-described various forms which is fitted in the housing and movably supports the rack shaft with respect to the housing.

In the rack-and-pinion type steering apparatus in accordance with the invention, the housing may be a hollow supporting member for supporting the rack shaft together with the gear housing for accommodating the pinion. Preferably, the housing is a gear housing for accommodating the pinion, and the bush bearing is disposed in the housing, or in the gear housing serving as the housing in a preferred example, so as to movably support the portion of the rack shaft on the side adjacent to such a pinion.

ADVANTAGES OF THE INVENTION

According to the present invention, it is possible to provide a bush bearing and a rack-and-pinion type steering apparatus for an automobile using the same, which make it possible to support the rack shaft with predetermined rigidity in its radial direction and in the axial direction of the pinion, make it possible to movably support the rack shaft with low frictional resistance in the axial direction of the rack shaft, and make it possible to reduce the effect of stress relaxation consequent upon creep deformation and thermal history.

Hereafter, a more detailed description will be given of the present invention with reference to the preferred embodiments shown in the drawings. It should be noted that the present invention is not limited to these embodiments.

BEST MODE FOR CARRYING OUT THE INVENTION

Figure 7:
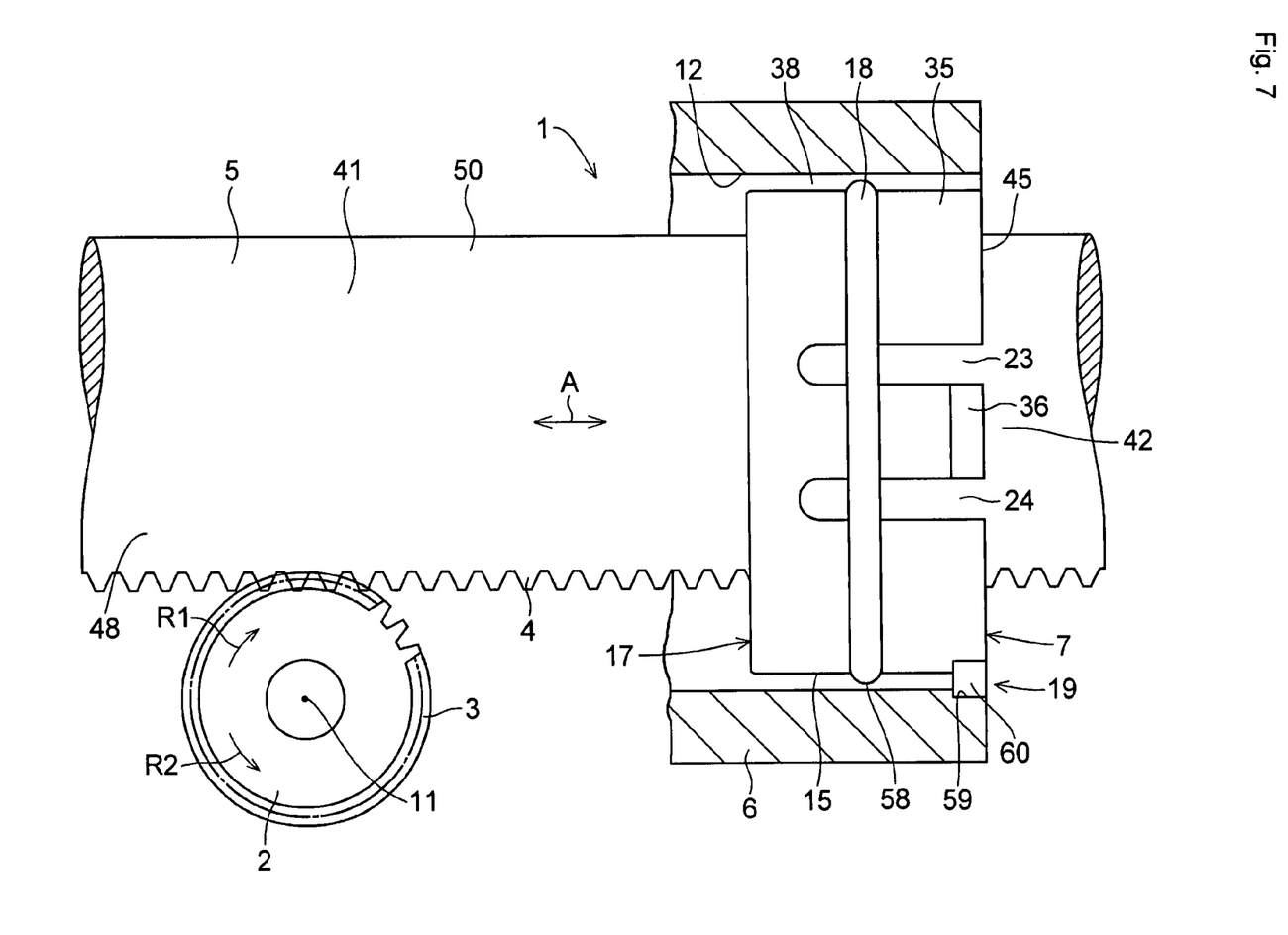
FIG. 7 is an explanatory view of an embodiment in which the embodiment shown in FIG. 1 is used in a rack-and-pinion type steering apparatus for an automobile.
Figure 8:
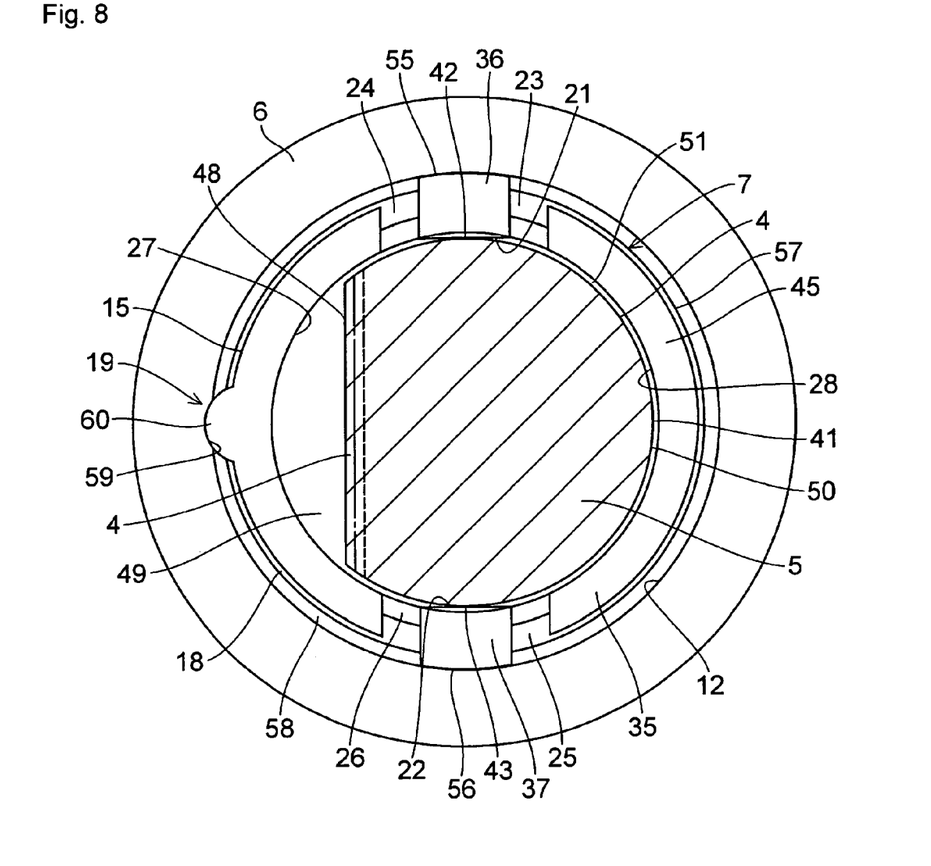
FIG. 8 is a right side elevational view of the embodiment shown in FIG. 7.

In FIGS. 7 and 8, a rack-and-pinion type steering apparatus 1 for an automobile in accordance with this embodiment includes a pinion 2; a rack shaft 5 having rack teeth 4 meshing with teeth 3 of the pinion 2; a gear housing 6 serving as a housing through which the rack shaft 5 is passed; and a bush bearing 7 which is fitted in the gear housing 6 and supports the rack shaft 5 movably in an A direction, i.e., an axial direction, with respect to the gear housing 6.

The pinion 2, having an axis 11, is adapted to be rotated about the axis 11 in an R1 direction or an R2 direction by the rotation of a steering wheel. The gear housing 6 has a cylindrical inner peripheral surface 12 to which the bush bearing 7 is fitted.

As particularly shown in FIGS. 1 to 5, the bush bearing 7 includes a synthetic resin-made bush 17 having a circumferential groove 16 on its outer peripheral surface 15; an endless annular elastic member 18 fitted in the circumferential groove 16 of the bush 17 and constituted by an O-ring made of natural rubber or synthetic rubber; and a positioning means 19 for determining the position of the bush 17 in a B direction, i.e., a circumferential direction, with respect to the inner peripheral surface 21 of the gear housing 6.

The bush 17 has a main body portion 35 and two protrusions 36 and 37 which are integrally provided on the outer peripheral surface 15 of the main body portion 35 and are spaced apart from each other with an interval of 180° in the B direction. The main body portion 35 includes the outer peripheral surface 15; the circumferential groove 16; a pair of flat surface-shaped inside inner peripheral surfaces 21 and 22 which are disposed axially symmetrically with an interval of 180° in the B direction; two pairs of slits 23 and 24 as well as 25 and 26, which are respectively disposed with the inside inner peripheral surfaces 21 and 22 located therebetween in the B direction, and allow the respective inside inner peripheral surfaces 21 and 22 to be movable in an inward/outward direction in a radial C direction; a pair of outer inner peripheral surfaces 27 and 28 which are respectively disposed on outer sides of the inside inner peripheral surfaces 21 and 22 in the C direction; and another pair of slits 29 and 30 which partially sever the respective ones of the outer inner peripheral surfaces 27 and 28 in the B direction.

The outer peripheral surface 15 is partially severed in the B direction by the slits 23 to 26 as well as 29 and 30, and forms a gap 38 with respect to the inner peripheral surface 12 of the gear housing 6.

Figure 1:
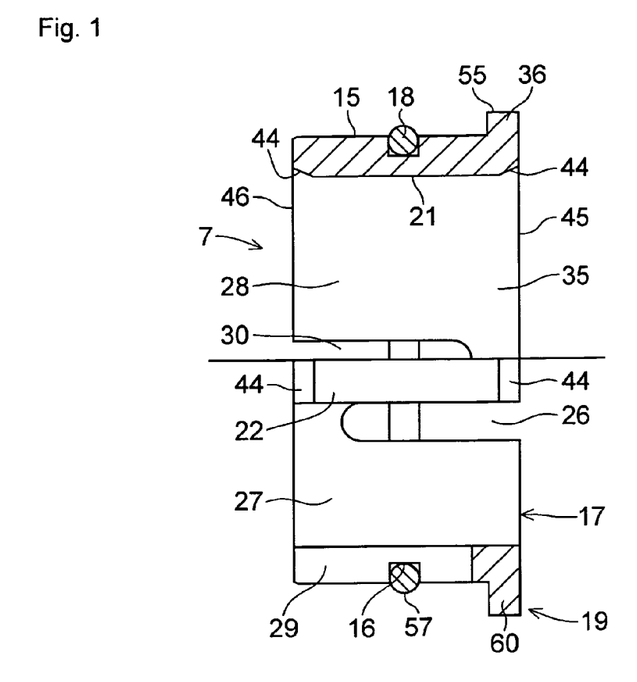
FIG. 1 is a cross-sectional view, taken in the direction of arrows along line I-I shown in FIG. 2, of a preferred embodiment of the invention.
Figure 2:
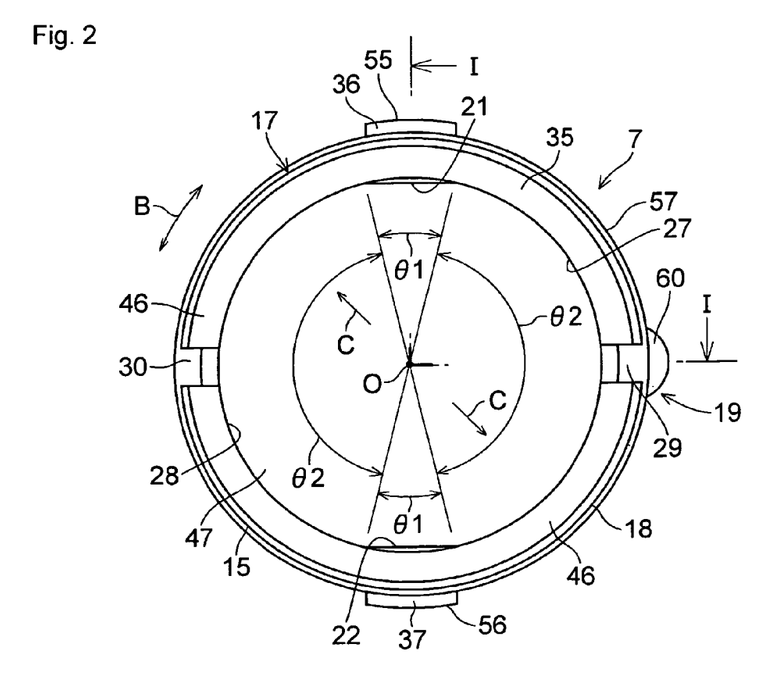
FIG. 2 is a left side elevational view of the embodiment shown in FIG. 1.
Figure 3:
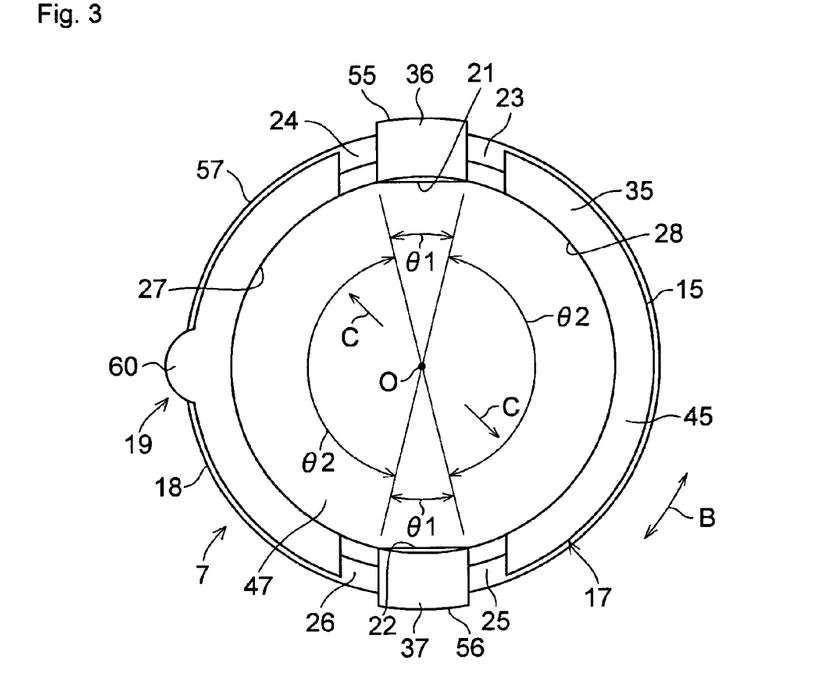
FIG. 3 is a right side elevational view of the embodiment shown in FIG. 1.
Figure 4:
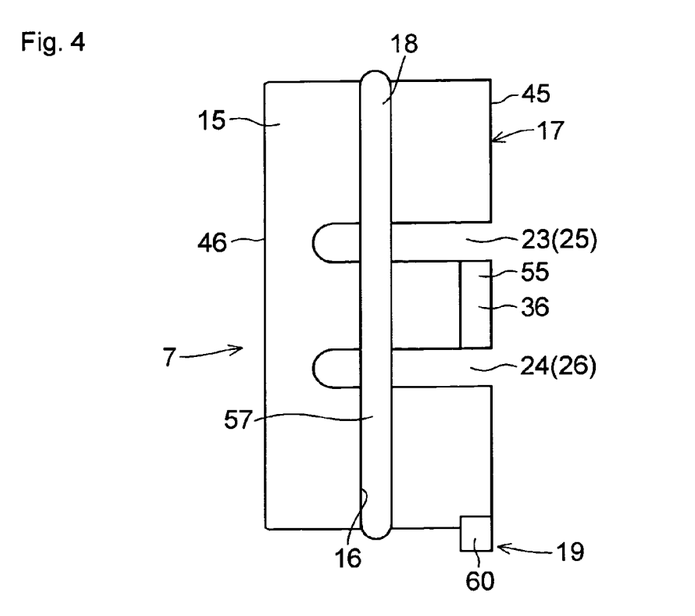
FIG. 4 is a plan view of the embodiment shown in FIG. 1.
Figure 5:
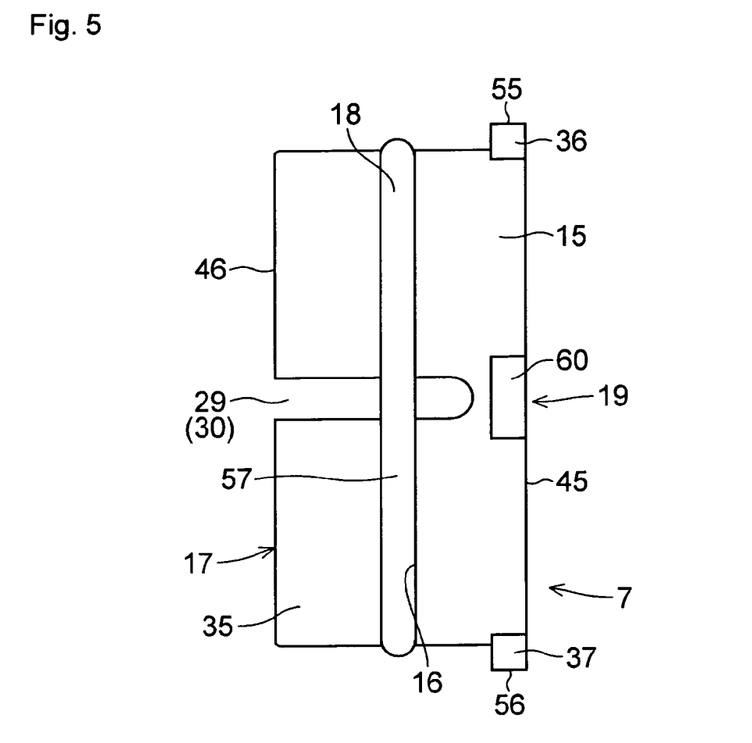
FIG. 5 is a bottom view of the embodiment shown in FIG. 1.
Figure 6:
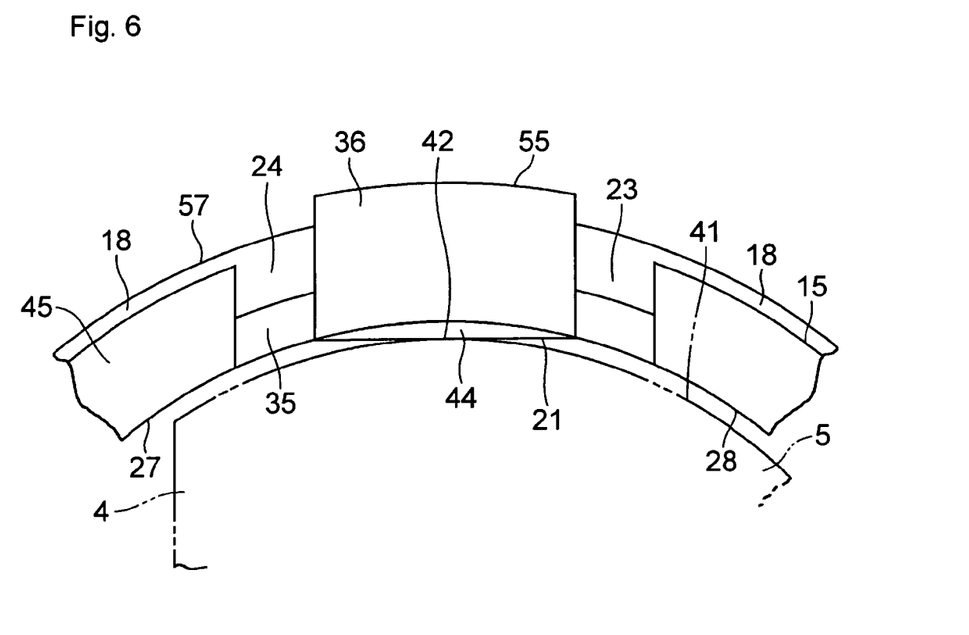
FIG. 6 is a partially enlarged explanatory view of the embodiment shown in FIG. 1.

The inside inner peripheral surface 21 has a center angle θ1 of not less than 5° and not more than 90°, i.e., 30° in this embodiment, about a center O of the rack shaft 5, while the inside inner peripheral surface 22 also has a center angle θ1 of not less than 5° and not more than 90°, i.e., 30° in this embodiment, about the center O of the rack shaft 5. As particularly shown in FIGS. 6 to 8, the inside inner peripheral surface 21 at its portion is adapted to slidably come into substantially linear contact with an outer peripheral surface 42, excluding outer peripheral surfaces on the rack teeth 4 side and an opposite side to the rack teeth 4 side of the rack shaft 5, in an outer peripheral surface 41 of the rack shaft 5. The inside inner peripheral surface 22 at its portion is also adapted to slidably come into substantially linear contact with an outer peripheral surface 43, excluding the outer peripheral surfaces on the rack teeth 4 side and the opposite side to the rack teeth 4 side of the rack shaft 5, in the outer peripheral surface 41 of the rack shaft 5. Respective end portions 44 in the direction A of the inside inner peripheral surfaces 21 and 22 may each be terminated with a tapered surface.

Each of the pair of slits 23 and 24 disposed with the inside inner peripheral surface 21 located therebetween in the B direction is open at one end face 45 in the A direction of the main body portion 35 of the bush 17, and extends in the A direction from the one end face 45 to a vicinity of another end face 46 in the A direction of the main body portion 35 of the bush 17 past the circumferential groove 16. Each of the pair of slits 25 and 26 disposed with the inside inner peripheral surface 22 located therebetween in the B direction is also open at the one end face 45 in the A direction of the main body portion 35 of the bush 17, and extends in the A direction from the one end face 45 to a vicinity of the other end face 46 in the A direction of the main body portion 35 of the bush 17 past the circumferential groove 16.

The outer inner peripheral surface 27 which has a center angle θ2 (180°−θ1) about the center O of the rack shaft 5 on the rack teeth 4 side of the rack shaft 5 is adapted to form a gap 49 with an outer peripheral surface 48 on the rack teeth 4 side in the outer peripheral surface 41 of the rack shaft 5, which is inserted and secured in a through hole 47 defined by the inside inner peripheral surfaces 21 and 22 and the outside inner peripheral surfaces 27 and 28. The outer inner peripheral surface 28 which has the center angle θ2 (180°−θ1) about the center O of the rack shaft 5 on the opposite side to the rack teeth 4 side of the rack shaft 5 is adapted to form a semicylindrical gap 51 with the outer peripheral surface 50 on the opposite side to the rack teeth 4 side of the rack shaft 5 in the outer peripheral surface 41 of the rack shaft 5.

Each of the slits 29 and 30, which are disposed axially symmetrically with the interval of 180° in the B direction and are disposed on the rack teeth 4 side and the opposite side to the rack teeth 4 side of the rack shaft 5, is open at the other end face 46 of the main body portion 35 of the bush 17 and extends in the A direction from the other end face 46 to a vicinity of the one end face 45 of the main body portion 35 of the bush 17 past the circumferential groove 16.

The protrusion 36 having a cylindrical outer peripheral surface 55 is disposed by being sandwiched by the pair of slits 23 and 24 in the B direction and, at its outer peripheral surface 55, is adapted to come into tight contact with the inner peripheral surface 12 of the gear housing 6, through which the rack shaft 5 is passed, with the elastic force of the synthetic resin-made bush 17. The protrusion 37, having a cylindrical outer peripheral surface 56, is disposed by being sandwiched by the pair of slits 25 and 26 in the B direction and, at its outer peripheral surface 56, is adapted to come into tight contact with the inner peripheral surface 12 of the gear housing 6, through which the rack shaft 5 is passed, with the elastic force of the synthetic resin-made bush 17. Thus, the bush 17 is fitted to the inner peripheral surface 12 of the gear housing 6 by means of the protrusions 36 and 37.

The endless annular elastic member 18 forms an annular gap 58 between its outer peripheral surface 57 and the inner peripheral surface 12 of the gear housing 6, the annular gap 58 being narrower than the gap 38. The endless annular elastic member 18 is fitted in the circumferential groove 16 in such a manner as to protrude partially from the outer peripheral surface 15 so as to resiliently slightly reduce the diameter of the main body portion 35 of the bush 17.

The positioning means 19 has a projection 60 formed integrally on the outer peripheral surface 15 of the main body portion 35. The projection 60 is engaged with the gear housing 6, i.e., in a recess 59 formed in the inner peripheral surface 12 of the gear housing 6, at its leading end portion in the C direction and its end face in the A direction. This ensures that the bush 17 does not rotate relative to the gear housing 6 in the B direction and is not inserted into the gear housing 6 more than is necessary. At the same time, the inside inner peripheral surfaces 21 and 22, the protrusions 36 and 37, and the slits 23 to 26 as well as 29 and 30 are disposed by being positioned with respect to the rack teeth 4 of the rack shaft 5.

In the above-described rack-and-pinion type steering apparatus 1, the bush 17 has the pair of flat surface-shaped inside inner peripheral surfaces 21 and 22 which are disposed axially symmetrically and the two pairs of slits 23 and 24 as well as 25 and 26, which are respectively disposed with the inside inner peripheral surfaces 21 and 22 located therebetween in the B direction, and allow the respective inside inner peripheral surfaces 21 and 22 to be movable in the inward/outward direction in the C direction. Each of the inside inner peripheral surfaces 21 and 22 at its portion is adapted to slidably come into contact with a corresponding one of the outer peripheral surfaces 42 and 43, excluding the outer peripheral surfaces on the rack teeth 4 side and the opposite side to the rack teeth 4 side of the rack shaft 5. Moreover, the endless annular elastic member 18 is fitted in the circumferential groove 16 of the bush 17. Therefore, the rack shaft 5 can be supported with predetermined rigidity in the C direction or the axial direction of the pinion 2, i.e., in the vertical direction in FIG. 8, the displacement of the rack shaft 5 in the axial direction of the pinion 2 can be suppressed by the pair of inside inner peripheral surfaces 21 and 22, and the movement thereof in the A direction can be movably supported with low frictional resistance. Moreover, the outer inner peripheral surfaces 27 and 28 are respectively adapted to form the gaps 49 and 51 with the corresponding ones of the outer peripheral surfaces 48 and 50 on the rack teeth 4 side and the opposite side to the rack teeth 4 side of the rack shaft 5, which is inserted and secured in the through hole 47. Hence, coupled with the above, it is possible to reduce the effect of stress relaxation consequent upon creep deformation and thermal history.

Figure 9:
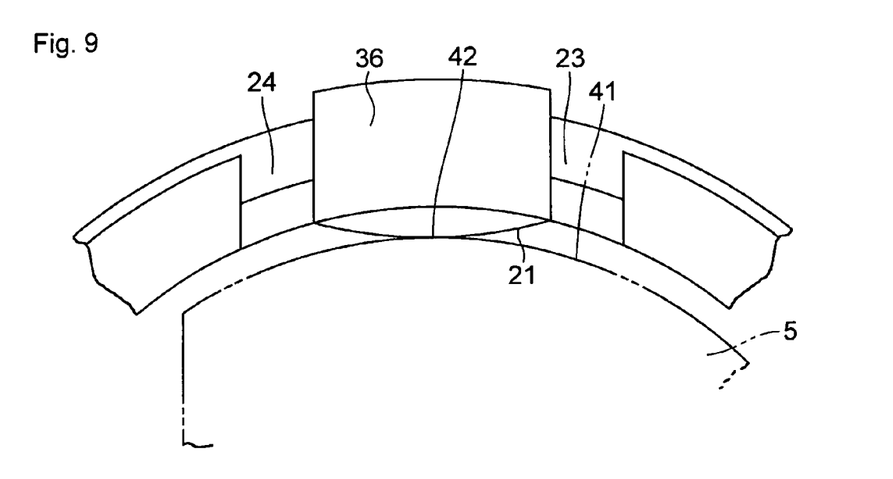
FIG. 9 is a partially enlarged explanatory view of another preferred embodiment of the invention.
Figure 10:
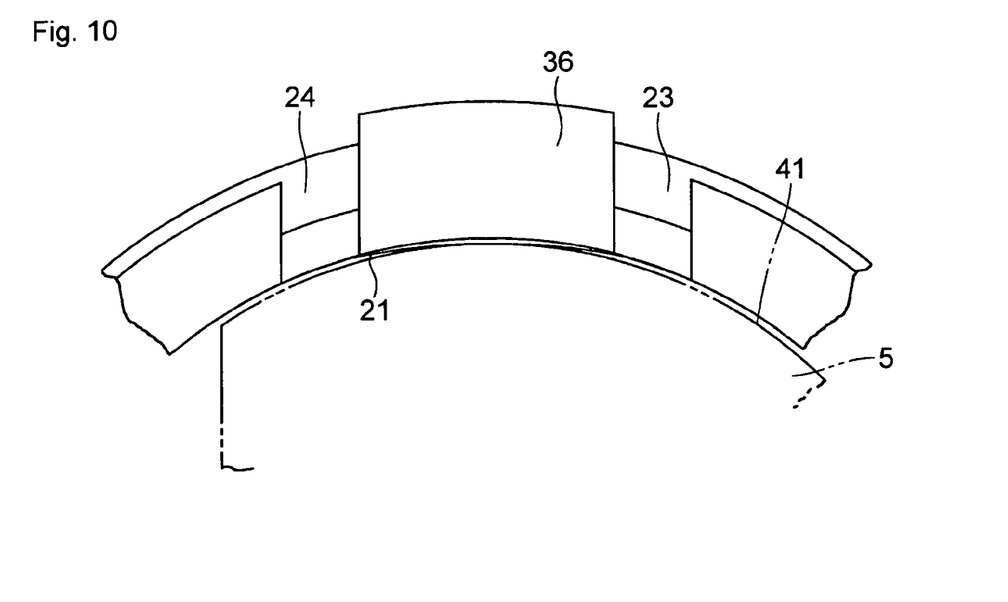
FIG. 10 is a partially enlarged explanatory view of still another preferred embodiment of the invention.

In the above-described embodiment, each of the inside inner peripheral surfaces 21 and 22 has a flat surface shape, but may alternatively have a convex surface shape, i.e., a semicylindrical convex surface shape, as shown in FIG. 9. Still alternatively, each of the inside inner peripheral surfaces 21 and 22 may have a concave surface shape having a greater radius of curvature than the radius of curvature of the cylindrical outer peripheral surface 41 of the rack shaft 5, i.e., a semicylindrical concave surface shape, as shown in FIG. 10.

The invention claimed is:

1. A bush bearing comprising: a synthetic resin-made bush having at least one circumferential groove in an outer peripheral surface thereof; and an endless annular elastic member which is fitted in the circumferential groove of said bush, wherein said bush has a pair of inside inner peripheral surfaces which are disposed axially symmetrically; a pair of slits which are each disposed with one of the inside inner peripheral surfaces located therebetween in a circumferential direction, and which allow that inside inner peripheral surface to be movable in a radially inward/outward direction; another pair of slits which are each disposed with the other one of the inside inner peripheral surfaces located therebetween in the circumferential direction, and which allow that inside inner peripheral surface to be movable in the radially inward/outward direction; and at least one pair of outer inner peripheral surfaces disposed on an outer side of the pair of inside inner peripheral surfaces in a radial direction, wherein each of the outer inner peripheral surfaces is adapted to form a gap with a corresponding one of outer peripheral surfaces on a rack teeth side and an opposite side to the rack teeth side of a rack shaft which is inserted and secured in a through hole defined by the pair of inside inner peripheral surfaces and the pair of outer inner peripheral surfaces, and wherein each of the inside inner peripheral surfaces at least at its portion is adapted to slidably come into contact with a corresponding outer peripheral surface of said rack shaft, excluding outer peripheral surfaces on the rack teeth side and the opposite side to the rack teeth side of said rack shaft.

2. The bush bearing according to claim 1, wherein the inside inner peripheral surface has a convex surface shape, a concave surface shape, or a flat surface shape.

3. The bush bearing according to claim 1, wherein each of the inside inner peripheral surfaces has a center angle $\theta 1$ of not less than 5° and not more than 90° about a center of said rack shaft, and each of the outer inner peripheral surfaces has a center angle $\theta 2$ of $(180° - \theta 1)$ about the center of said rack shaft.

4. The bush bearing according to claim 1, wherein each of the slits is open at one end face in an axial direction of said bush and extends in the axial direction from the one end face to a vicinity of another end face in the axial direction of said bush past the circumferential groove.

5. The bush bearing according to claim 1, wherein said bush further has at least one other pair of slits which are each open at the other end face in the axial direction of said bush, extend in the axial direction from the other end face to a vicinity of the one end face in the axial direction of said bush past the circumferential groove, and are respectively disposed on the rack teeth side and the opposite side to the rack teeth side of said rack shaft.

6. The bush bearing according to claim 1, wherein said bush has a main body portion including the inside inner peripheral surfaces, the outer inner peripheral surfaces, the outer peripheral surface, and the circumferential groove, and a plurality of protrusions provided integrally on the outer peripheral surface of the main body portion and spaced apart from each other in the circumferential direction, and the plurality of protrusions are adapted to come into contact with an inner peripheral surface of a housing through which the rack shaft is passed.

7. The bush bearing according to claim 6, wherein one of the plurality of protrusions is disposed by being sandwiched in the circumferential direction by the pair of slits disposed with one of the inside inner peripheral surfaces located therebetween, and another one of the plurality of protrusions is disposed by being sandwiched in the circumferential direction by the other pair of slits disposed with the other one of the inside inner peripheral surfaces located therebetween.

8. The bush bearing according to claim 1, further comprising: positioning means for determining a position of said bush in the circumferential direction with respect to the inner peripheral surface of the housing.

9. A rack-and-pinion steering apparatus for an automobile comprising: a pinion; a rack shaft having rack teeth meshing with teeth of said pinion; a housing through which said rack shaft is passed; and the bush bearing according to claim 1 which is fitted in said housing and movably supports said rack shaft with respect to said housing.

* * * * *